United States Patent
Min et al.

(10) Patent No.: US 9,454,698 B2
(45) Date of Patent: Sep. 27, 2016

(54) IRIS RECOGNITION TERMINAL AND METHOD

(71) Applicant: IRIS ID, INC., Seoul (KR)

(72) Inventors: Seung Gi Min, Seoul (KR); Kie Young Lee, Seoul (KR)

(73) Assignee: IRIS ID, INC, Seoul (KR)

(*) Notice: Subject to any disclaimer, the term of this patent is extended or adjusted under 35 U.S.C. 154(b) by 0 days.

(21) Appl. No.: 14/729,952

(22) Filed: Jun. 3, 2015

(65) Prior Publication Data
US 2015/0347843 A1  Dec. 3, 2015

(30) Foreign Application Priority Data

Jun. 3, 2014 (KR) .................... 10-2014-0067913

(51) Int. Cl.
  *G06K 9/00* (2006.01)
  *G07C 9/00* (2006.01)

(52) U.S. Cl.
  CPC ............. *G06K 9/00604* (2013.01); *G06K 9/00* (2013.01); *G06K 9/0061* (2013.01); *G06K 9/00617* (2013.01); *G07C 9/00158* (2013.01)

(58) Field of Classification Search
  CPC .............. G06K 9/00597; G06K 9/00281; G06K 9/00604; G06K 9/0061; G06K 9/00248; G06K 9/4661; G06K 9/00; G06K 9/00228; G06K 9/3216; A61B 3/1216; A61B 3/112; A61B 3/12; A61B 5/0075; A61B 5/743; G06T 2207/30041; G06T 2207/10144; G06T 5/00; G06T 5/50; G06T 7/408; G06T 2207/10048; G06T 2207/30216; G06T 5/40; G06T 7/0002; A61F 2009/00846; A61F 2009/00863; A61N 5/1049; G06F 21/32; C01P 2006/80; H04N 13/0472; H04N 2013/0081; H04N 5/2254; H04N 1/624; H04N 5/23; H04S 2400/11; G07C 9/00158; G08C 2201/42; H04L 12/2807; H04L 63/0853; H04L 63/105; H04M 1/72533
  USPC ....... 382/103, 117, 165, 209, 224, 167, 197; 351/206, 221; 345/173, 600
  See application file for complete search history.

(56) References Cited

U.S. PATENT DOCUMENTS 5,621,424 A * 4/1997 Shimada .............. G02B 27/017 345/8
6,097,894 A * 8/2000 Suda ...................... G03B 17/20 396/121

(Continued)

FOREIGN PATENT DOCUMENTS

EP   1341119 A2   9/2003
WO   2014/014153 A1  1/2014

OTHER PUBLICATIONS

European Search Report for Application No. 15170288.3 dated Oct. 8, 2015; 7 pages.

*Primary Examiner* — Vu Le
*Assistant Examiner* — Aklilu Woldemariam
(74) *Attorney, Agent, or Firm* — Loza & Loza, LLP; Heidi L. Eisenhut (57) ABSTRACT

A terminal for minimizing a gazing phenomenon in an iris recognition terminal is disclosed. The iris recognition terminal may minimize the gazing phenomenon by including an eyeball reflection unit. Also, it is also possible to minimize the gazing phenomenon by displaying a positioner on a display unit. A person who wears glasses may experience specular light on the iris recognition terminal but the terminal of the present disclosure avoids the specular light. The terminal determines the location of the specular light and guides an avoidance location to a user based on the determination, so quick and accurate iris recognition is possible.

9 Claims, 8 Drawing Sheets

(56) References Cited

U.S. PATENT DOCUMENTS

| | | | | |
|---|---|---|---|---|
| 6,714,665 B1* | 3/2004 | Hanna | G06K 9/00 382/106 |
| 8,818,091 B2* | 8/2014 | Zimmer | G06K 9/0061 348/222.1 |
| 2002/0039433 A1* | 4/2002 | Shin | G06K 9/00597 382/117 |
| 2002/0130961 A1* | 9/2002 | Lee | G07C 9/00158 348/333.03 |
| 2003/0118212 A1* | 6/2003 | Min | G06K 9/00597 382/100 |
| 2003/0123711 A1* | 7/2003 | Kim | G06K 9/00597 382/117 |
| 2005/0248725 A1* | 11/2005 | Ikoma | G06K 9/00604 351/206 |
| 2006/0250218 A1* | 11/2006 | Kondo | G06K 9/00597 340/5.82 |
| 2010/0097580 A1* | 4/2010 | Yamamoto | G02B 26/101 353/69 |
| 2011/0273554 A1* | 11/2011 | Su | G06F 21/32 348/78 |
| 2012/0083667 A1* | 4/2012 | Isogai | A61B 3/102 600/300 |
| 2012/0128327 A1* | 5/2012 | Matsubara | H04N 9/8227 386/244 |
| 2012/0293629 A1* | 11/2012 | Min | G06K 9/00604 348/46 |
| 2013/0102273 A1* | 4/2013 | Jung | H04W 12/08 455/404.2 |
| 2013/0223681 A1* | 8/2013 | Lee | G06K 9/00597 382/103 |
| 2013/0278800 A1* | 10/2013 | Liu | H04N 5/23296 348/240.1 |
| 2014/0049451 A1* | 2/2014 | Sugiyama | G03H 1/0808 345/8 |

* cited by examiner

IRIS RECOGNITION TERMINAL AND METHOD

CROSS-REFERENCE TO RELATED APPLICATIONS

The present application claims priority under 35 U.S.C. 119 and 35 U.S.C. 365 to Korean Patent Application No. 10-2014-0067913 (filed on Jun. 3, 2014), which is hereby incorporated by reference in its entirety.

BACKGROUND

The present disclosure relates to an iris recognition terminal and method. Since a typical key, an access control card or the like has limitations in that it has relatively low security due to the easiness of theft, loss or copying, there is a need to carry it, and there is a need to memorize a password, many researches on individual identification technologies ensuring higher security and greater convenience are being conducted in order to such limitations.

Among others, a biometric recognition system is being gradually commercialized and biometric recognition means extracting biometric information (fingerprint, face, iris, retina, hand shape, hand vein, voice or the like) that is different from one person to another and performing determination. An image of a corresponding body part is captured by using a camera to extract information for recognition and among others, a person identification system through iris recognition is being widely used.

The iris recognition terminal is an apparatus that recognizes the iris of a visitor to identify the identity of the person. Such an iris recognition system is taking center stage as a new security system because the copying or forging of iris is difficult. The iris recognition system is installed on the gate, on the wall, or independently to identify the identity of the visitor.

In recent, the iris recognition terminal is also used for a portable terminal to identify the identity of a user. In this process, since a screen that the user looks is different from the location of a lens of a camera capturing an image of the user, a gazing phenomenon occurs and thus there is a difficulty in recognizing iris.

Also, light reflected to glasses is working as a handicap for iris recognition to a user wearing the glasses. Thus, there is inconvenience of having to take off the glasses due to specular light each time the user performs iris recognition or of increasing in recognition time when compared to a normal operation.

SUMMARY

Embodiments provide an iris recognition terminal for more easily performing iris recognition through a match of a point of an iris recognition terminal at which a user looks and a point of the iris recognition terminal from which an infrared ray is irradiated, and an iris recognition method.

In particular, embodiments provide an iris recognition terminal that enables quick and accurate iris recognition by maximizing a match between user's eyes with an point of an apparatus from which an infrared ray is irradiated, because a camera is typically located at the upper part of a display unit of a portable terminal.

Also, there may be cases where people who wear glasses may not correctly obtain an image of iris due to specular light from the glasses. In this case, embodiments provide an iris recognition apparatus that provides quick and accurate iris recognition without inconvenience of taking off the glasses by displaying, on a display unit, a positioner enabling a user to avoid specular light.

In one embodiment, an iris recognition terminal includes an image collection part collecting an image of the iris of a user's eye by using an infrared ray; an image processing part recognizing iris from the collected image; and a display unit displaying a positioner guiding the location of an eyeball to a user, wherein the image collection part includes an eyeball reflection unit reflecting visible light and transmitting the infrared ray.

The eyeball reflection unit may be at least one of a cold mirror and an infrared (IR) pass filter.

The eyeball reflection unit may include a visible light transmission unit reflecting an infrared ray and transmitting visible light.

The visible light transmission unit may include glass through which visible light passes.

The eyeball reflection unit may include a convex mirror.

The display unit may display the positioner near the image collection part.

The iris recognition terminal may further include a specular light search unit determining the location of specular light, wherein the control unit guides an avoidance location to a user based on the location of the specular light determined by the specular light search unit, and the display unit displays a positioner displaying the avoidance location received from the control unit.

The image collection part may include a lighting unit.

In another embodiment, an iris recognition method includes irradiating an infrared to an eyeball of a user; collecting, by a narrow-angle image collection unit, an image of the eyeball lit by the irradiated infrared ray; collecting an image obtained by including the image collected by the narrow-angle image collection unit in an angle collected by a wide-angle image collection unit; determining whether the eyeball of the user of the image including the image collected by the narrow-angle image collection unit is within a positioner displayed on a display unit; and extracting an iris pattern and recognizing iris, when the eyeball of the user is within the positioner, wherein the positioner is displayed near the image collection part.

The details of one or more embodiments are set forth in the accompanying drawings and the description below. Other features will be apparent from the description and drawings, and from the claims.

DETAILED DESCRIPTION OF THE EMBODIMENTS

Embodiments of the present disclosure are described below in detail with reference to the accompanying drawings so that a person skilled in the art may easily practice the present disclosure. However, the present disclosure may be implemented in several different forms and is not limited to embodiments that are described herein. In addition, parts irrelevant to descriptions are not provided in the drawings in order to make the present disclosure clear and similar parts throughout the disclosure have similar reference numerals.

Also, when it is described that a part includes an component, it should be understood that it may not exclude but further include other components if there is no specific description contrary thereto.

Some embodiments are described below in more detail with reference to the accompanying drawings. Noun suffixes such as "part", "module", and "unit" for components in description below are given or mixed in consideration of easiness in writing the specification. That is, the noun suffixes themselves do not have respectively distinguishable meanings or roles.

Figure 1:
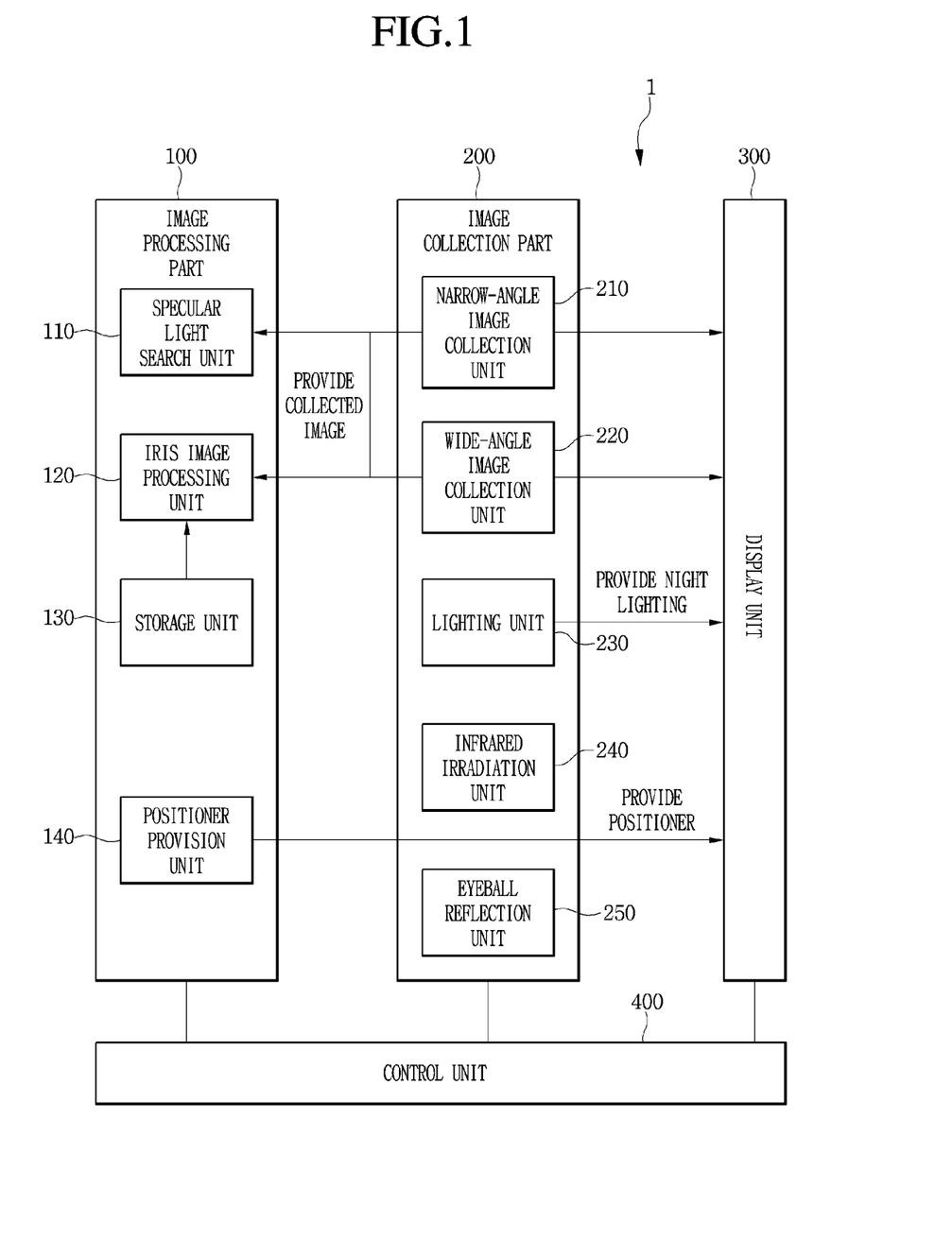
FIG. 1 is a block diagram of an iris recognition terminal according to an embodiment.

FIG. 1 is a block diagram of an iris recognition terminal 1 according to an embodiment.

As shown in FIG. 1, the iris recognition terminal 1 according to an embodiment includes an image processing part 100, an image collection part 200, a display unit 300, and a control unit 400.

In an embodiment, the image processing part 100 may include a secular light search unit 110, an iris image processing unit 120, a storage unit 130, and a positioner provision unit 140. The present disclosure is not limited to the above components and other components may be added.

The secular light search unit 110 receives an image of a user from a narrow-angle image collection unit 210 and wide-angle image collection unit 220 to determine the presence and absence of specular light. In particular, it is determined whether there is specular light disturbing iris recognition around iris. Since iris recognition is performed through the irradiation of an infrared ray, the presence and absence of specular light is determined from an image collected from the narrow-angle image collection unit 210, not an image collected from the wide-angle image collection unit 220 that it is difficult to collect the infrared ray.

The specular light search unit 110 determines the chromaticity of a received image, in which case a part close to a maximum number of colors in the determined chromaticity is determined to be a part close to white. A corresponding point becomes specular light indicated by a white color on an image. The specular light search unit 110 transmits information on a corresponding point to the control unit 400 to lead to the display of a positioner when specular light is found.

The iris image processing unit 120 recognizes iris through the process of comparing an image received from the narrow-angle image collection unit 210 and the wide-angle image collection unit 220 with iris information prestored in the storage unit 130. In particular, the iris image processing unit 120 extracts information on a user iris pattern from the received image, and compares information on the extracted iris pattern with a pre-stored iris pattern to recognize iris. The comparison with the pre-stored iris may be performed by the iris image processing unit 120 or the control unit 400.

The storage unit 130 stores pattern information on iris to be recognized. Iris information stored in the storage unit 130 may be related to a single person but also be related to more persons. The storage unit 130 may include at least one of storage media such as a flash memory type memory, a hard disk type memory, a multimedia card micro type memory, a card type memory (e.g., SD or XD memory), a magnetic memory, a magnetic disk, an optical disk, a RAM, an SRAM, an EEPROM, and a PROM.

The positioner provision unit 140 displays, on the display unit 300, a positioner leading to easy iris recognition. In an embodiment, the positioner may be a positioner leading the distance between an eyeball of a user and the image collection part to be minimized. In details, the positioner is located within a predetermined distance. In another embodiment, the positioner may be a positioner leading a user to avoid specular light.

In an embodiment, the image collection part 200 may include the narrow-angle image collection unit 210, the wide-angle image collection unit 220, the lighting unit 230, the infrared irradiation unit 240, and the eyeball reflection unit 250. The image collection part 200 is discussed in detail with reference to FIGS. 2 and 3.

Figure 2:
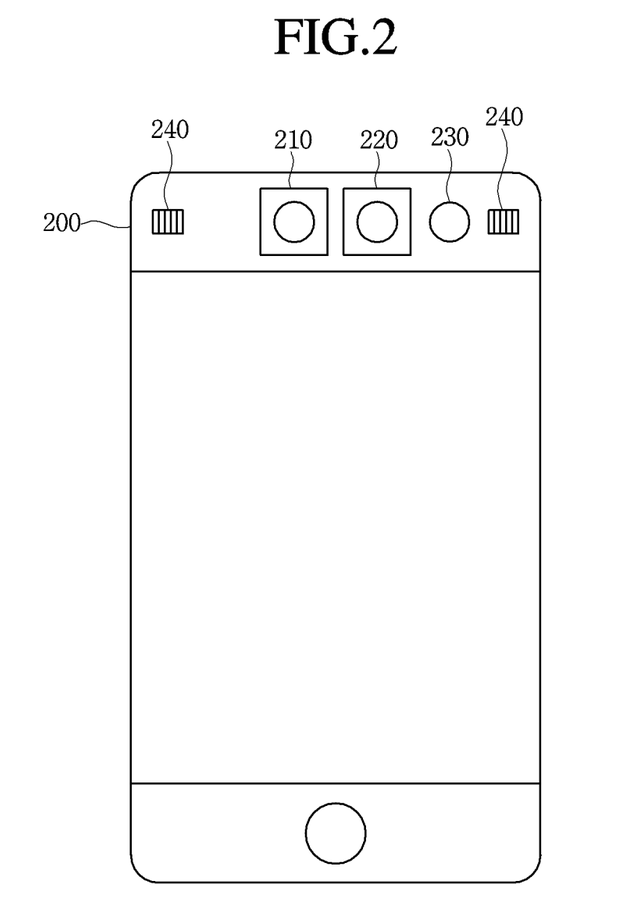
FIG. 2 is a front view showing a layout of components of an image collection part.

FIG. 2 is a front view showing a layout of components of the image collection part 200.

Figure 3:
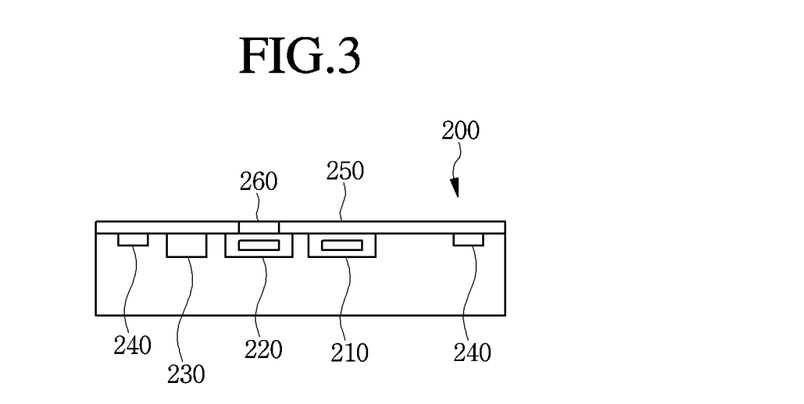
FIG. 3 is a cross-sectional view of the image collection part of FIG. 2.

FIG. 3 is a cross-sectional view of the image collection part 200 of FIG. 2.

Referring to FIG. 2, the display unit 300 is generally located at the center of a terminal, and the image collection part 200 is generally located at the upper end of the display unit 300. Each component is now discussed in detail.

The narrow-angle image collection unit 210 collects an image of an eyeball of a user lit by the infrared irradiation unit 240. The narrow-angle image collection unit 210 may be an image sensor or other devices that may collect images of an eyeball in addition to a camera.

The narrow-angle image collection unit 210 may use a lens that passes both an infrared ray and visible light. Thus, the narrow-angle collection unit 210 may collect an infrared ray irradiated from the infrared irradiation unit 240 and then reflected to the eyeball of the user.

The narrow-angle image collection unit 210 collects an image of an eyeball of a user with a narrow angle of view. An image collected by the narrow-angle image collection unit 210 is transmitted to the iris image processing unit 120 and the image is compared with a prestored iris pattern to recognize the iris of a user's eye.

The wide-angle image collection unit 220 collects an image having a wider range than an image collected by the narrow-angle image collection unit 210, including an eyeball of an user. The wide-angle image collection unit 220 is configured to capture an image with a wider angle of view in order to collect an image having a wider range than an image of an eyeball collected by the narrow-angle image collection unit 210.

In particular, the wide-angle image collection unit 220 may be configured to cover a wider range than the narrow-angle image collection unit 210. The wide-angle image collection unit 220 may check to which part an image having a narrow region collected by the narrow-angle image collection unit 210 including an image collected by the narrow-angle image collection unit 210 corresponds.

For example, when the iris recognition terminal 1 faces a user, the narrow-angle image collection unit 210 may collect an image of a jaw, a forehead or a background, not an eyeball of a user. Then, there are cases where it is difficult to know which part of a user the terminal is capturing, only with an image collected by the narrow-angle image collection unit 210. However, since the wide-angle image collection unit 220 covers a wider region than the narrow-angle image collection unit 210, it is possible to easily know which part of a user face the narrow-angle image collection unit 210 is capturing, through the image collected by the wide-angle image collection unit 220.

The wide-angle image collection unit 220 may be an image sensor or other devices that may collect images of an eyeball, in addition to the camera, like the narrow-angle image collection unit 210.

The lighting unit 230 provides light to a user. Since the narrow-angle image collection unit 210 collects an infrared image, what it is dark at night causes no problem. However, since a user attempts to recognize iris based on an image displayed on the display unit 300 or a form reflected to the eyeball reflection unit 250, it may be difficult to easily recognize iris when there is no light at night. Thus, a user face may be displayed on the display unit 300 to be capable of being recognized by irradiating light to the user face by the infrared irradiation unit 240. In an embodiment, the lighting unit 230 may include LED lighting. In particular, a white LED may be used as LED lighting for easily recognizing a user's appearance.

The eyeball reflection unit 250 provides the user's appearance, especially features around an eyeball. In an embodiment, the eyeball reflection unit 250 may be attached to a surface of the image collection part 200. In another embodiment, it may be attached by insertion into a surface of the image collection part 200.

The eyeball reflection unit 250 may include at least one of a cold mirror and an infrared (IR) pass filter. The cold mirror indicates a mirror that transmits an infrared ray and reflects visible light. It is possible to show features around an eyeball to a user by reflecting the visible light from the external surface of the eyeball reflection unit 250. On the other hand, the infrared ray passes through the eyeball reflection unit 250 and thus enables the narrow-angle image collection unit to collect information on an eyeball of a user lit by the infrared ray.

The eyeball reflection unit 250 is particularly described with reference to FIG. 3.

As shown in FIG. 3, the eyeball reflection unit 250 may be located at the upper end of the image collection unit 200. As described above, the eyeball reflection unit 250 includes a material that may not transmit the visible light and may transmit only the infrared ray. As a result, there may be cases where an image of iris lit by the infrared irradiation unit 240 may be collected by the narrow-angle image collection unit 210 but the wide-angle image collection unit 220 may not collect the image because visible light is reflected by the eyeball reflection unit 250.

Thus, in order to avoid the above limitation, the eyeball reflection unit 250 may include a visible light transmission unit 260 transmitting visible light, only over the lens of the narrow-angle image collection unit 220 as shown in FIG. 3. In particular, the visible light transmission unit 260 may include a general glass transmitting visible light in an embodiment. In another embodiment, the visible light transmission unit 260 may be a through hole that vertically passes the eyeball reflection unit 250.

The eyeball reflection unit 250 may also a convex mirror. In an embodiment, a surface of the eyeball reflection unit 250 may be a convex mirror. In another embodiment, the eyeball reflection unit may be in the shape of a convex mirror. Since the convex mirror has a wider reflection region per unit area than a plane mirror, it is possible to cover a user face on a limited region more widely than the plane mirror.

Refer back to FIG. 2.

The infrared irradiation unit 240 irradiates an infrared ray to an eyeball of a user. In particular, the infrared irradiation unit 240 applies infrared lighting to an eyeball of a user. In order to effectively irradiate the infrared ray to both eyes of a user, two infrared irradiation units 240 may be located at the opposite ends of the image collection part 200. In addition the infrared ray, the infrared irradiation unit 240 may use a ray that may most effectively detect an iris pattern for iris registration or recognition. In an embodiment, the infrared irradiation unit 240 may irradiate an infrared ray of about 700 nm to about 900 nm.

The display unit 300 receives and displays images from the narrow-angle image collection unit 210 and the wide-angle image collection unit 220. Also, it is possible to display a positioner received from the positioner provision unit 140.

The control unit 400 controls at least one of the image processing part 100, the image collection part 200, and the display unit 300. In particular, the control unit 400 may enable the image processing part 100 to compare a pre-stored iris pattern with a collected iris pattern to recognize iris. Also, it is possible to control the display of a positioner to a user for avoiding specular light based on the location of the specular light recognized.

Figure 4:
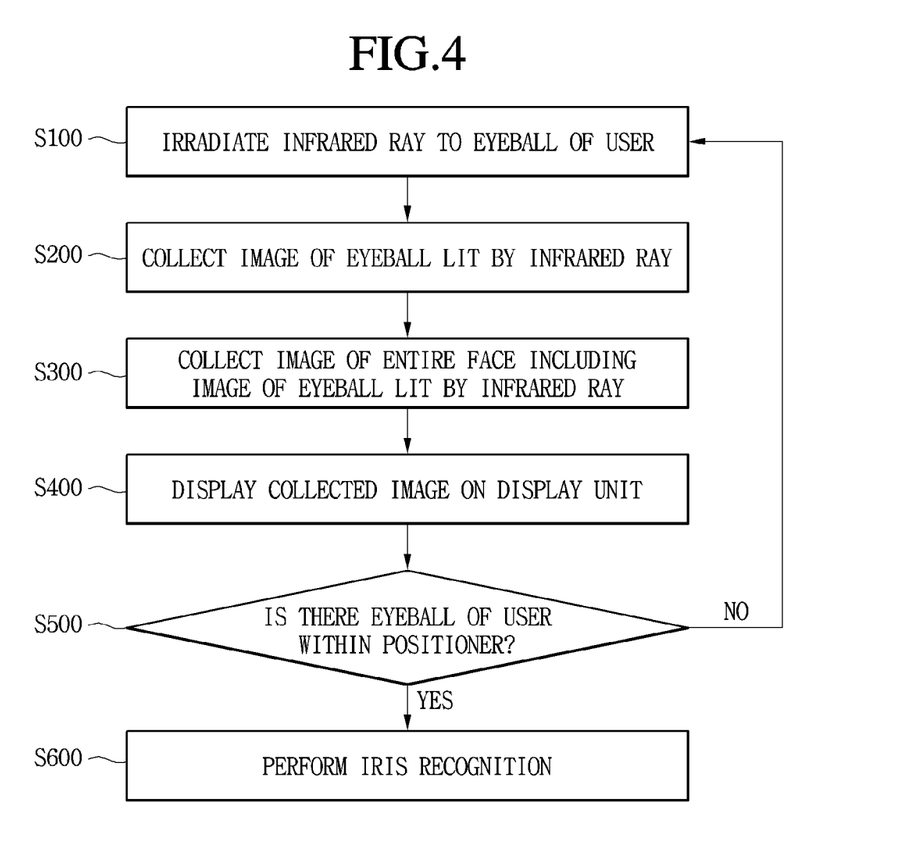
FIG. 4 is a flowchart of an iris recognition process according to an embodiment.

FIG. 4 is a flowchart of an iris recognition process according to an embodiment.

The infrared irradiation unit 240 irradiates an infrared ray to an eyeball of a user in step S100. Tow infrared irradiation units 240 may be located at the opposite ends of the image collection part 200 to irradiate infrared rays to both eyes of a user, respectively.

An image of an eyeball lit by the infrared ray is collected by the narrow-angle image collection unit 210 in step S200. The narrow-angle image collection unit 210 includes a lens that may transmit an infrared ray, unlike the wide-angle image collection unit 220. Thus, it is possible to collect an image that an iris pattern is reflected by the infrared ray.

The wide-angle image collection unit 220 collects an image of the entire face including an image of an eyeball collected by the narrow-angle image collection unit 210 in step S300. The wide-angle image collection unit 220 may collect only a visible light image because it includes a lens through which the infrared ray may not pass. However, since the narrow-angle image collection unit 210 may collect only an image having a narrow range, it may not collect an image of the entire face of a user in an apparatus capturing an image of a subject in a short distance, such as a portable terminal. Thus, the wide-angle image collection unit 220 may collect an image having a wider range than an image collected by the narrow-angle image collection unit to recognize the entire face of a user.

The display unit 300 displays a collected image along with an eyeball region positioner in step S400. In an embodiment, the eyeball region positioner may be rectangular. In another embodiment, the eyeball region positioner may be a shape that is displayed on the eyeball reflection unit.

The control unit 400 determines whether an eyeball of a user is within the eyeball region positioner, in step S500. Step 500 is described with reference to FIGS. 5 and 6.

Figure 5:
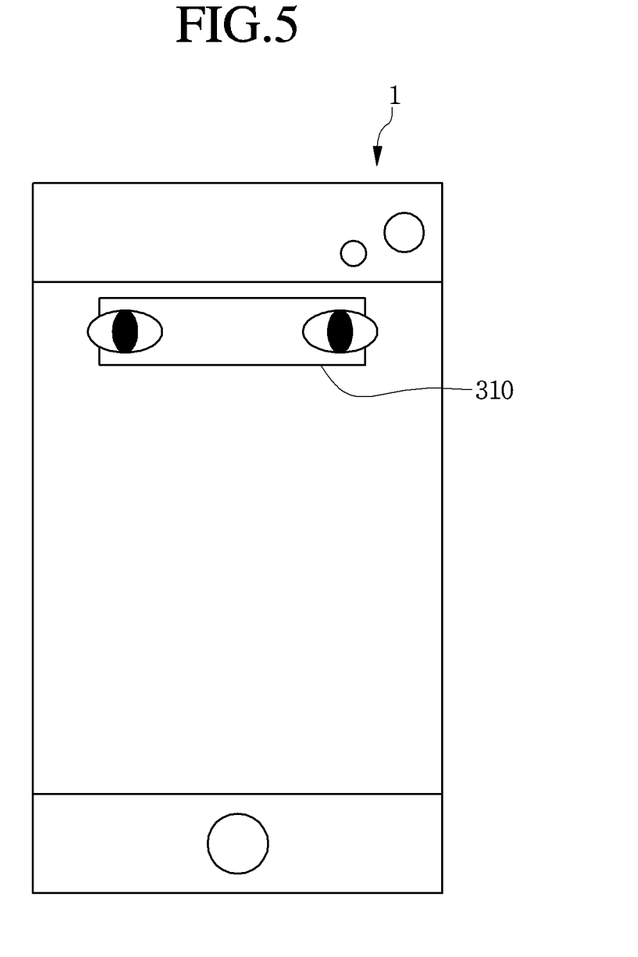
FIG. 5 represents when an eyeball region positioner is displayed on a display unit.

FIG. 5 represents when an eyeball region positioner is displayed on the display unit 300.

In general, a portable terminal includes a camera collecting an image at the upper end of the terminal. This is because the display unit 300 should be located at the central of the terminal. Thus, there is a gazing phenomenon that causes a difference in point in that a point at which a user looks is a point at which the display unit 300 is located but a point that actually collects an image is located at the upper end of the display unit 300.

In order to solve the gazing phenomenon, the terminal has typically matched the point of the terminal at which the user looks, with the point that actually collects through compensation by the terminal. However, such a method needs a complex compensation algorithm and cases where it is difficult to perform iris recognition even with a compensated result are also frequent.

In an embodiment, a first positioner 310 guiding the location of an eyeball of a user is displayed at the upper end of the display unit 300. However, the first positioner 310 has no need to be located at the upper end and a display location may vary according to the location of the image collection unit 200.

In an embodiment, it is possible to display the first positioner 310 at the upper end of the display unit 300 close to the image collection part 200 located at the upper end of the iris recognition terminal 1 to minimize the gazing phenomenon. Since the first positioner 310 is displayed close to the location of the image collection part 200, the difference between a part at which a user looks and a part that actually collects an image may be minimized. Thus, it is possible to simply minimize the gazing phenomenon without a typical, additional compensation algorithm.

In particular, the first positioner 310 is displayed at the upper end of the display unit 300. A user may locate his or her eyeball based on the first positioner 310 displayed. In an embodiment, the first positioner 310 may be initially displayed in red color. When an eyeball of a user is located on the first positioner 310 displayed in red color, a corresponding positioner may be changed to green color.

Figure 6:
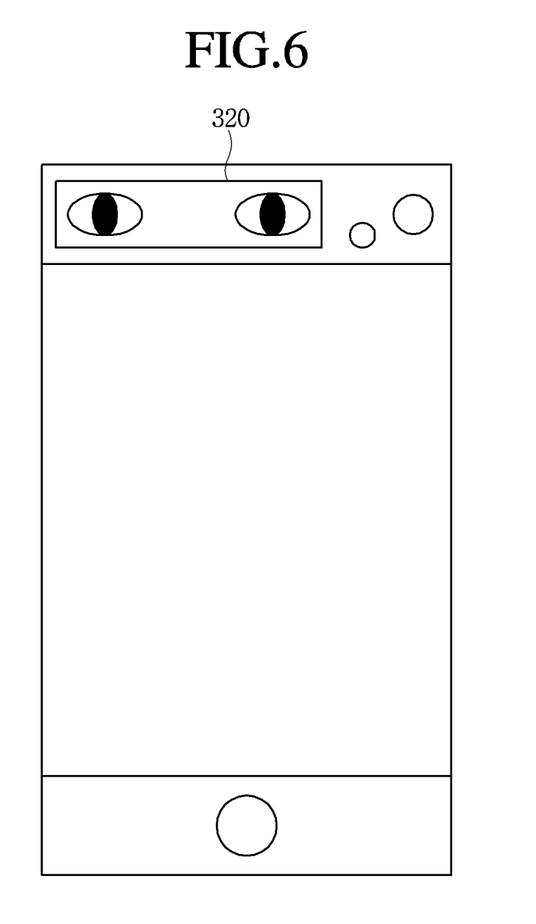
FIG. 6 represents when eyeballs of a user are displayed on an eyeball reflection unit of an iris recognition terminal including the eye reflection unit.

FIG. 6 represents when an eyeball of a user is displayed on the eyeball reflection unit 250 on the iris recognition terminal 1 including the eyeball reflection unit 250.

A second positioner 320 may be located in the image collection part 200. The second positioner 320 may guide, to a user, the location of an eyeball suitable for iris recognition. The eyeball of a user is reflected to the eyeball reflection unit 250 and the location suitable for iris recognition may be guided to the user with a reflected shape.

As a result, since the eyeball reflection unit 250 is located on the surface of the image collection part 200, a point at which the user looks may significantly match a point that actually collects an image. Thus, the terminal may quickly recognize the iris of a user's eye through the minimization of the gazing phenomenon.

Refer back to FIG. 4.

If the eyeball of the user is located within the eyeball region positioner, the iris image processing unit 120 performs iris recognition in step S600. The iris image processing unit 120 extracts an iris pattern from the image of the eyeball lit by the infrared ray and then compares the extracted iris pattern with a pre-stored iris pattern. The comparison with the pre-stored iris pattern may also be performed by the control unit 400.

If the eyeball of the user is not located within the eyeball region positioner, the process returns to step S100.

Figure 7:
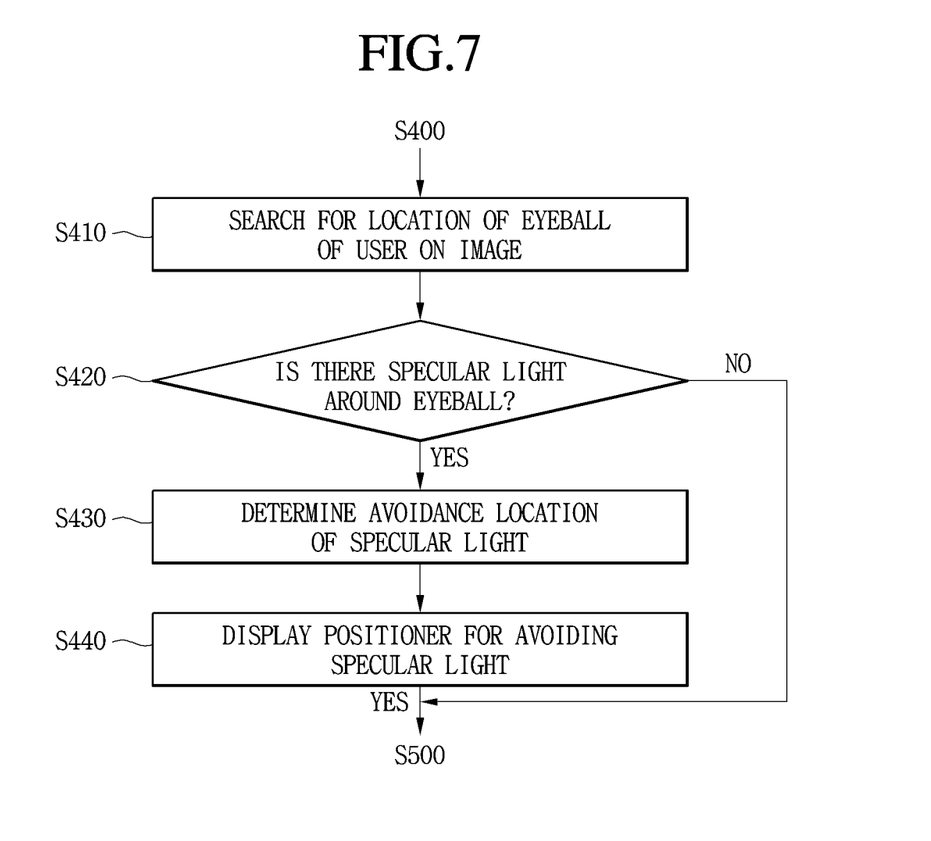
FIG. 7 is a flowchart of a process of collecting an image through avoidance of specular light when specular light is generated while a user who wears glasses recognizes his or her iris.

FIG. 7 is a flowchart of a process of collecting an image through avoidance when specular light is generated while a user who wears glasses recognizes his or her iris.

The specular light indicates a white dot displayed on an image due to the reflection of an infrared ray by glasses worn by the user. Since it is difficult to recognize an iris pattern when the specular light is formed near the iris of an user's eyes, the process of avoiding the specular light is needed.

The following step is continued from step S400 on the flowchart of FIG. 4.

The specular light search unit 110 searches for the eyeball of the user based on the images received from the wide-angle image collection unit 220 and the narrow-angle image collection unit 210 in step S410. In an embodiment, the specular light search unit 110 may search for a user face on the image collected by the wide-angle image collection unit 220 and then search for the eyeball of the user. In another embodiment, the specular light search unit 110 may turn on/off the visible lighting of the lighting unit 230 to search for the eyeball by using the difference between two images. In another embodiment, the specular light search unit 110 may use an algorithm searching for an eyeball by using the characteristics of the eyeball to search for the location of the eyeball.

The specular light search unit 110 searches for the eyeball of the user on the displayed image to determine whether there is the specular light 340 around the eyeball, in step S420. The specular light 340 is light obtained by reflecting the infrared ray from glasses and is displayed in white color on an image. Thus, the specular light 340 is a part of the image that has highest chromaticity. The specular light search unit 110 searches for a part having highest chromaticity on the image received from the narrow-angle image collection unit 210 to determine a corresponding part to be the specular light 340.

The control unit 400 determines the avoidance location of a user based on the location of corresponding specular light, if the specular light 340 is located around the eyeball, in step S430. The control unit 400 may also not determine the avoidance location, if there is no specular light 340 or if there is the specular light 340 but it does not affect iris recognition.

The control unit 400 guides the determined avoidance location to the user with a positioner in step S440. The process of avoiding the specular light is described below with reference to FIGS. 8a and 8b.

Figure 8:
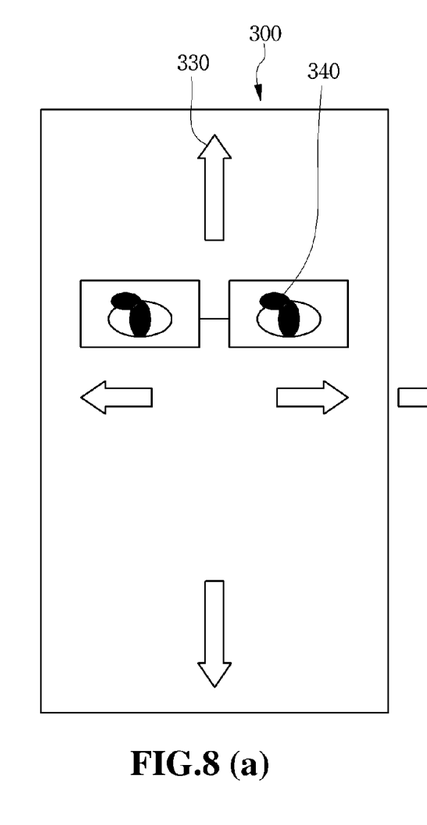
FIGS. 8a and 8b represent a process of enabling a user to avoid specular light by displaying a positioner.

FIGS. 8a and 8b represent a process of enabling a user to avoid the specular light 340 by displaying a positioner.

Referring to FIG. 8a, it may be seen that the specular light search unit 110 has found the specular light 340 at the upper left end of an eyeball of a user. This is a case where it is difficult to perform iris recognition due to the specular light 340, so the control unit 400 may control a third positioner 330 displayed on the upper, lower, left and right sides of the screen so that the user moves to the lower right end.

Referring to FIG. 8b, it may be seen that according to the determination of the control unit 400, positioners indicating the right and lower sides among the third positioners 330 may be displayed in dark color. A user may move his or her face according to a corresponding guide to avoid the specular light 340.

Refer back to FIG. 7.

After the user avoids the specular light 340 according to the third positioner 330, step S500 in FIG. 4 is continued and thus descriptions are omitted.

The iris recognition terminal according to an embodiment may provide an eyeball region positioner to a display unit, thus maximize a match between user's eyes and the location of an infrared irradiation unit of the iris recognition terminal, and thus recognize the iris of a user's eyes more accurately and quickly.

The iris recognition terminal according to an embodiment may configure a whole or portion of the upper end of an apparatus on which a camera and an infrared irradiation unit are placed, with a cold mirror or infrared pass filter, thus maximize a match between user's eyes and the location of the infrared irradiation unit of the iris recognition terminal, thus recognize the iris of a user's eyes more accurately and quickly.

The iris recognition terminal according to an embodiment may provide a positioner enabling a user wearing glasses to avoid specular light and thus decrease inconvenience in the process of recognizing iris by the user wearing glasses.

The characteristics, structures, and effects described in the embodiments above are included in at least one embodiment but are not limited to one embodiment. Furthermore, the characteristic, structure, and effect illustrated in each embodiment may be combined or modified for other embodiments by a person skilled in the art. Thus, it would be construed that contents related to such a combination and such a variation are included in the scope of embodiments.

Embodiments are mostly described above. However, they are only examples and do not limit the present disclosure. A person skilled in the art may appreciate that many variations and applications not presented above may be implemented without departing from the essential characteristic of embodiments. For example, each component particularly represented in embodiments may be varied. In addition, it should be construed that differences related to such a variation and such an application are included in the scope of the present disclosure defined in the following claims.

What is claimed is:

1. A mobile terminal for iris recognition, comprising:
    a narrow-angle image collection unit within a camera for collecting a first image of a user's eye by using an infrared ray, wherein the first image includes an iris image and a specular image caused by a specular light reflected by a user's glasses;
    a wide-angle image collection unit within the camera for collecting a second image wider than the first image, by using a visible light;
    an image processing part recognizing by a processor a user's iris from a combination of the first image and the second image;
    a specular light search unit determining by the processor a location of the specular image from the first image; and
    a display unit displaying the second image including a positioner guiding a location of an eyeball to a user, based on the location of the specular image, when the specular image interferes with the iris recognition,
    wherein the specular light search unit searching a part of the image that has highest chromaticity on the first image and determining the searched part to be the location of the specular image,
    wherein the displayed positioner comprises an indicator directing a position of the user's eye to avoid overlapping with the specular image, and
    wherein the indicator does not direct the position of the user's eye if there is no specular light or if the specular light does not affect iris recognition.

2. The mobile terminal for iris recognition according to claim 1, wherein a direction of the indicator is opposite to a direction of the specular image based on center of the iris image.

3. The mobile terminal for iris recognition according to claim 1, further comprising:
    an eyeball reflection unit comprises a visible light transmission unit reflecting an infrared ray and transmitting visible light.

4. The mobile terminal for iris recognition according to claim 3, wherein the visible light transmission unit comprises glass through which visible light passes.

5. The mobile terminal for iris recognition according to claim 3, wherein the eyeball reflection unit comprises a convex mirror.

6. The mobile terminal for iris recognition according to claim 1, wherein the display unit displaying the positioner within a predetermined distance from an image collection part including the narrow-angle image collection unit and the wide-angle image collection unit.

7. The mobile terminal for iris recognition according to claim 6, wherein the image collection part comprises a lighting unit.

8. An operating method of a mobile terminal for iris recognition comprising:
    collecting, by a narrow-angle image collection unit within a camera, a first of a user's eye by using an infrared ray, wherein the first image includes an iris image and a specular image caused by a specular light reflected by a user's glasses;
    collecting, by a wide angle image collection unit within the camera, a second image wider than the first image, by using a visible light;
    recognizing by a processor a user's iris from a combination of the first image and the second image;
    determining by the processor a location of the specular image from the first image; and
    displaying the second image including a positioner guiding a location of an eyeball to a user, based on the location of the specular image, when the specular image interferes with the iris recognition,
    wherein the specular light search unit searching a part of the image that has highest chromaticity on the first image and determining the searched part to be the location of the specular image,
    wherein the displayed positioner comprises an indicator directing a position of the user's eye to avoid overlapping with the specular image, and
    wherein the indicator does not direct the position of the user's eye if there is no specular image or if the specular image does not affect iris recognition.

9. The operating method according to claim 8, wherein a direction of the indicator is opposite to a direction of the specular image based on a center of the iris image.

* * * * *